(12) United States Patent
Bogue et al.

(10) Patent No.: US 7,614,848 B2
(45) Date of Patent: Nov. 10, 2009

(54) FAN EXIT GUIDE VANE REPAIR METHOD AND APPARATUS

(75) Inventors: William Bogue, Hebron, CT (US); John J. Golias, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 464 days.

(21) Appl. No.: 11/545,403

(22) Filed: Oct. 10, 2006

(65) Prior Publication Data

US 2008/0085187 A1 Apr. 10, 2008

(51) Int. Cl.
*F03B 11/02* (2006.01)

(52) U.S. Cl. .................... 415/191; 415/200; 415/209.3; 415/210.1; 29/888.022

(58) Field of Classification Search ................. 415/191, 415/200, 209.3, 209.1, 209.2, 210.1; 29/889.22
See application file for complete search history.

(56) References Cited

U.S. PATENT DOCUMENTS

| | | | |
|---|---|---|---|
| 2,834,537 A | 5/1958 | Neary | |
| 2,857,093 A * | 10/1958 | Warnken | 415/209.3 |
| 2,914,300 A | 11/1959 | Sayre | |
| 3,132,841 A | 5/1964 | Wilder, Jr. | |
| 3,442,442 A | 5/1969 | Seiwert | |
| 3,556,675 A * | 1/1971 | Howald et al. | 416/190 |
| 4,721,462 A | 1/1988 | Collins, Jr. | |
| 4,940,386 A | 7/1990 | Feuvrier et al. | |
| 5,030,063 A | 7/1991 | Berger | |
| 5,074,752 A | 12/1991 | Murphy et al. | |
| 5,083,900 A | 1/1992 | Carletti et al. | |
| 5,171,398 A | 12/1992 | Miyamoto | |
| 5,226,789 A * | 7/1993 | Donges | 415/189 |
| 5,272,869 A | 12/1993 | Dawson et al. | |
| 5,423,716 A | 6/1995 | Strasbaugh | |
| 5,695,600 A | 12/1997 | Goin | |
| 5,707,051 A | 1/1998 | Tsuji | |
| 5,765,993 A | 6/1998 | Weiss | |
| 6,032,997 A | 3/2000 | Elliott et al. | |
| 6,238,515 B1 | 5/2001 | Tsujimoto et al. | |
| 6,505,395 B1 | 1/2003 | Farnworth et al. | |
| 6,619,917 B2 | 9/2003 | Glover et al. | |

(Continued)

FOREIGN PATENT DOCUMENTS

EP 171329 A1 * 2/1986

(Continued)

*Primary Examiner*—Igor Kershteyn
(74) *Attorney, Agent, or Firm*—Kinney & Lange, P.A.

(57) ABSTRACT

A replacement fan exit guide vane assembly for installation between an inner case and an outer case of a gas turbine engine includes an airfoil structure having an outer end and an inner end, a wedge structure connected to the outer end of the airfoil structure, a base plate positioned between the outer end of the airfoil structure and the outer case, a conformable material, and a slip collar having an opening therethrough and a recess formed along the opening. The airfoil structure extends through the opening, and the recess accepts the wedge structure to create an interference fit between the slip collar and the base plate. The conformable material is disposed along the opening and the recess in the slip collar, and also along the baseplate, in order to provide dampening relative to the airfoil structure and the wedge structure.

21 Claims, 5 Drawing Sheets

U.S. PATENT DOCUMENTS

| | | |
|---|---|---|
| 7,311,495 B2 | 12/2007 | Ashley et al. |
| 2003/0077879 A1 | 4/2003 | Ohno et al. |
| 2003/0121614 A1 | 7/2003 | Tabor et al. |
| 2007/0098548 A1 | 5/2007 | Barnett et al. |
| 2007/0237632 A1 | 10/2007 | Barnett et al. |

FOREIGN PATENT DOCUMENTS

| | | |
|---|---|---|
| JP | 06-302569 A1 | 10/1994 |
| JP | 2003-209082 A1 | 7/2003 |

* cited by examiner

FAN EXIT GUIDE VANE REPAIR METHOD AND APPARATUS

BACKGROUND OF THE INVENTION

The present invention relates to a method and apparatus for repairing fan exit guide vane assemblies for gas turbine engines. More particularly, the present invention relates to a method and apparatus that can be used to make temporary, on-wing repairs to fan exit guide vane assemblies of gas turbine engines.

Fan exit guide vanes (FEGVs) are aerodynamically shaped structures located aft of a gas turbine engine fan and forward of an engine support pylon, installed in a circumferentially spaced, spoke-like arrangement between inner and outer case structures that form a bypass duct. When a gas turbine engine is assembled, the FEGVs are installed between the two case structures before those case structures are connected with the fan. FEGVs help improve the efficiency and thrust output of gas turbine engines by straightening the air stream in the bypass duct flow.

FEGVs can be damaged or liberated during engine operation.

Common causes of damage and liberation include the ingestion of objects that move past the fan and strike one or more FEGVs, the occurrence of transient aerodynamic loads that stress the vanes (e.g., surge events), and the effects of deterioration and normal wear over time. Moreover, once at least one FEGV is liberated, the missing FEGV leads to stresses on adjacent FEGVs frequently leading to the liberation of clusters of adjacent FEGVs. Replacement of original FEGVs in an on-wing position is difficult or impossible. Typically, the only way to remove the FEGVs is to cut them in half.

However, when attempting to replace removed vanes, new FEGVs identical to the originals may not easily fit into the engine while on-wing due to limited clearances and interference from adjacent FEGVs. Thus, known solutions for on-wing repairs include destroying and removing multiple vanes and replacing only a fraction of the original vanes, or alternatively, leaving the engine with zones having no FEGVs. Drawbacks of these known solutions include decreased engine efficiency and regulatory restrictions on flight times for engines having missing or damaged FEGVs. Generally, these known on-wing repairs are only allowed temporarily until off-wing repairs can be completed. Additional on-wing repairs have been attempted, but have generally proven unsuccessful. Off-wing repairs result in substantially greater costs and lost engine flight time than on-wing repairs. Aircraft operators, such as commercial airlines, suffer tremendous losses due to delayed or canceled flights necessitated by off-wing FEGV repairs.

Thus, it is desired to provide a method and apparatus for fan exit guide vane (FEGV) repairs that addresses the problems with existing repair techniques.

BRIEF SUMMARY OF THE INVENTION

A replacement fan exit guide vane assembly according to the present invention for installation between an inner case and an outer case of a gas turbine engine includes an airfoil structure having an outer end and an inner end, a wedge structure connected to the outer end of the airfoil structure, a base plate positioned between the outer end of the airfoil structure and the outer case, a conformable material, and a slip collar having an opening therethrough and a recess formed along the opening. The airfoil structure extends through the opening, and the recess accepts the wedge structure to create an interference fit between the slip collar and the base plate. The conformable material is disposed along the opening and the recess in the slip collar, and also along the baseplate, in order to provide dampening relative to the airfoil structure and the wedge structure.

DETAILED DESCRIPTION

Figure 1:
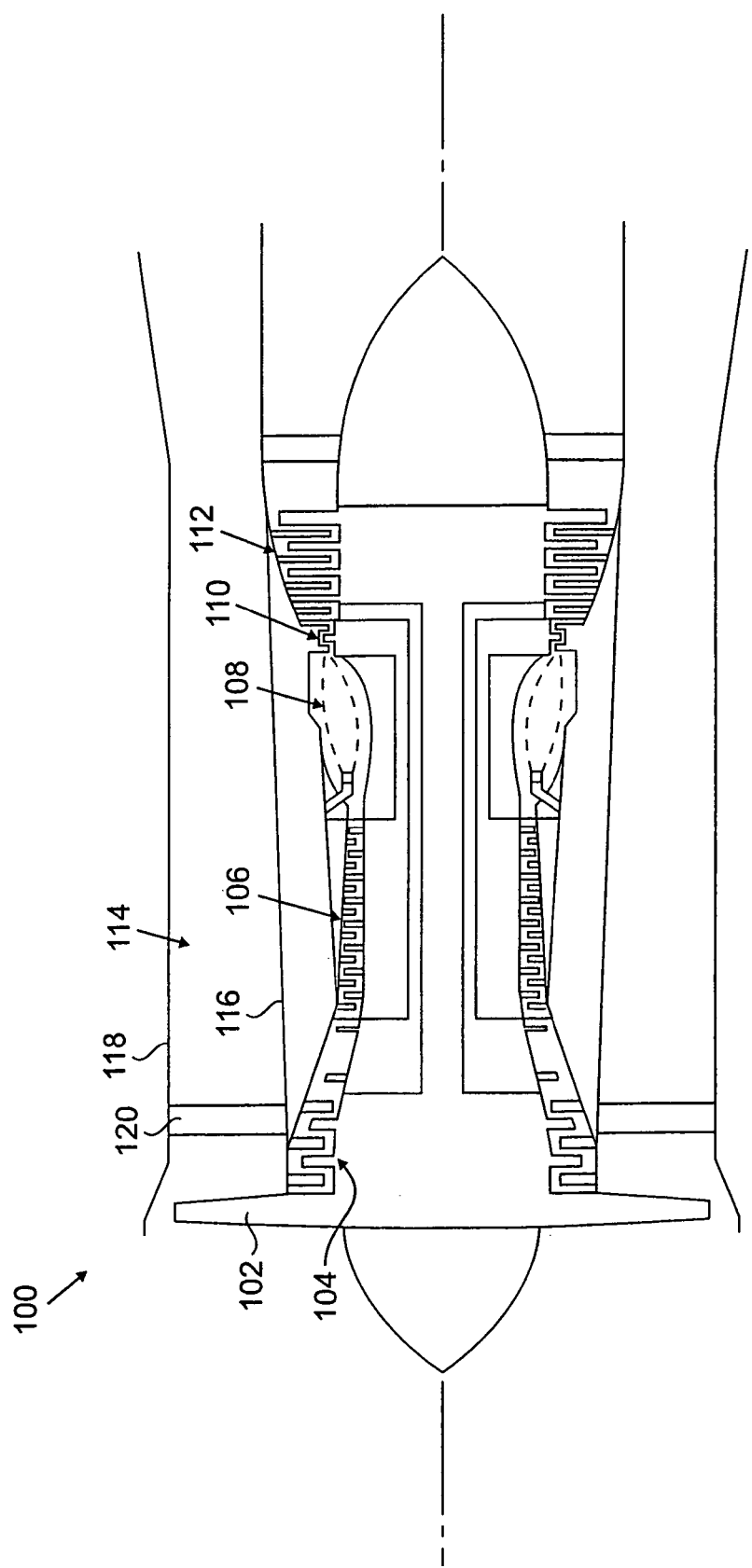
FIG. 1 is a schematic cross-sectional view of a gas turbine engine.

FIG. 1 is a simplified schematic cross-sectional view of a gas turbine engine 100 suitable for mounting to an aircraft airframe (not shown). The engine 100 includes a fan assembly 102 and a primary flowpath defined by a low pressure compressor assembly 104, a high pressure compressor assembly 106, a combustor assembly 108, a high pressure turbine 110 and a low pressure turbine 112. The engine 100 also includes another flowpath defined by a bypass duct 114, which is generally formed between an inner case 116 and an outer case 118. The bypass duct 114 is located radially outward of the primary flowpath. A set of fan exit guide vanes (FEGVs) 120 are positioned between the inner and outer cases 116 and 118 aft of the fan assembly 102. The FEGVs 120 each extend radially between the inner case 116 and the outer case 118, and are positioned in a circumferentially spaced, spoke-like arrangement with respect to each other. The FEGVs 120 are attached or fixtured to either the inner case 116 or outer case 118 and allowed to "float" radially relative to the other case (116 or 118). This "float" is achieved by the use of a slot or by the use of pins to control motion in the circumferential and axial directions.

During operation, the fan assembly 102 draws air into the engine 100. A portion of the "intake" air from the fan assembly 102 is diverted into the bypass duct 114. The FEGVs 120 are aerodynamically designed structures arranged in a radially spaced, spoke-like arrangement between the inner and outer cases 116 and 118. The FEGVs 120 help improve the efficiency and thrust output of the engine 100 by straightening the air stream through the bypass duct 114.

In the illustrated embodiment, the engine 100 is generally similar to known high-bypass ratio gas turbine engines. Those skilled in the art will understand the basic operation of gas turbine engines, so further explanation here is unnecessary. However, it should be recognized that the particular configuration of the engine 100 can vary from the illustrated embodiment, and the present invention can be utilized with nearly any type of gas turbine engine.

During operation of the engine 100, one or more of the FEGVs 120 may become damaged or become liberated (i.e., dislodged completely). The reasons for FEGV 120 damage or liberation are numerous and varied, although for present purposes it is sufficient to note that damage to or liberation of one or more of the FEGVs 120 can limit the operation of the engine 100. Often, there are restrictions as to the length of time for which the engine 100 can operate with damaged or liberated FEGVs 120 (e.g., an operational limit of 50 hours for an engine having two adjacent FEGVs missing). It is desired to perform on-wing repairs to the engine 100 to at least temporarily replace one or more of the FEGVs 120 to enable the engine 100 to return to service relatively quickly (e.g., in a matter of about 5-10 hours or less). Further repairs to the FEGVs 120 may be necessary or desirable, but more extensive off-wing repairs can be delayed for more desirable lengths of time with the use of temporary FEGV replacement assemblies and repair methods.

Figure 2:
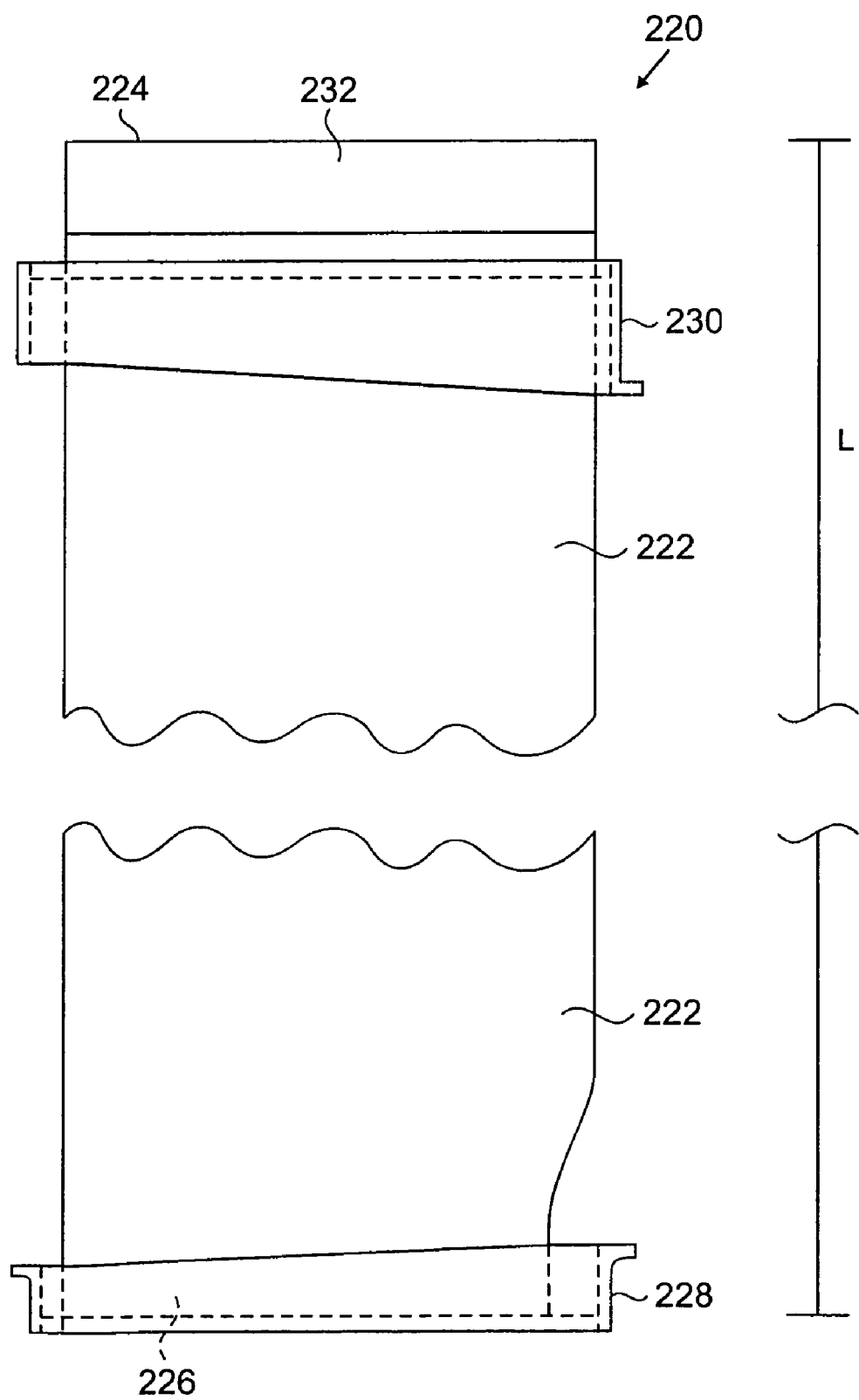
FIG. 2 is a side view of a portion of a replacement fan exit guide vane (FEGV) assembly according to the present invention.

FIGS. 2-5 illustrate a replacement FEGV assembly 220 for at least temporarily replacing a damaged or liberated original FEGV 120 of the engine 100. FIG. 2 is a side view of a portion of the replacement FEGV assembly 220. As shown in FIG. 2, the FEGV subassembly 220 includes an airfoil structure 222 having an outer end 224 and an inner end 226 (a middle portion of the airfoil structure 222 has been omitted in FIG. 2 as indicated by broken lines), an inner mounting structure 228, a slip collar 230, and a wedge 232.

The airfoil structure 222 is an aerodynamically shaped member that provides a fluid reaction surface that helps to direct (e.g., straighten) airflow when installed within the bypass duct 114 downstream of the fan assembly 102. The airfoil structure 222 has a radial length L defined between its inner and outer ends 224 and 226. The particular shape of the airfoil structure 222 will vary as desired for particular applications. Typically, the airfoil structure 222 is aerodynamically shaped to be substantially identical to original FEGVs for a particular engine. However, the length L of the airfoil structure 222, which is generally comparable to the overall radial length of the entire FEGV assembly 220, can be less than the length of an original FEGV replaced by the FEGV assembly 220. Shortening the length L of the FEGV assembly 220 helps ease installation between inner and outer cases 116 and 118 of the engine 100 while on-wing and allows for addition of the base plate 246, as explained more fully below. The airfoil structure 222 can be made of materials commonly used for FEGV airfoils, for example, aluminum and composite materials. It is possible for the airfoil structure 222 to be either a refurbished part or a newly manufactured part.

The inner mounting structure 228 is connected to the inner end 226 of the airfoil structure 222. The inner mounting structure 228 enables the FEGV assembly 220 to be secured relative to the inner case 116 of the engine 100. The inner mounting structure 228 is a conventional pin-type connection structure identical to that used with original FEGVs. The inner mounting structure 228 secures the inner end 226 of the airfoil structure 222 on pins (not shown) in a "floating" manner, in order to prevent torquing and axial movement but still permits some radial movement to allow for thermal and pressure expansion during engine operation. In alternative embodiments, other types of known connection structures (e.g., expansion joints) can be used to secure the inner end 226 of the airfoil structure 222 to the inner case 116 of the engine 100.

The slip collar 230 is movably positioned about the airfoil structure 222 prior to installation in an engine (see FIG. 2). The wedge 232 is secured at the outer end 224 of the airfoil structure 222, and the slip collar 230 is positioned between the wedge 232 and the inner mounting structure 228. The wedge 232 can be made of metallic materials such as aluminum or of a composite material. Metallic wedges are generally secured to the airfoil structure 222 by a welding process (e.g., fusion welding), while composite wedges are generally secured to the airfoil structure 222 by bonding with structural adhesives.

Figure 3:
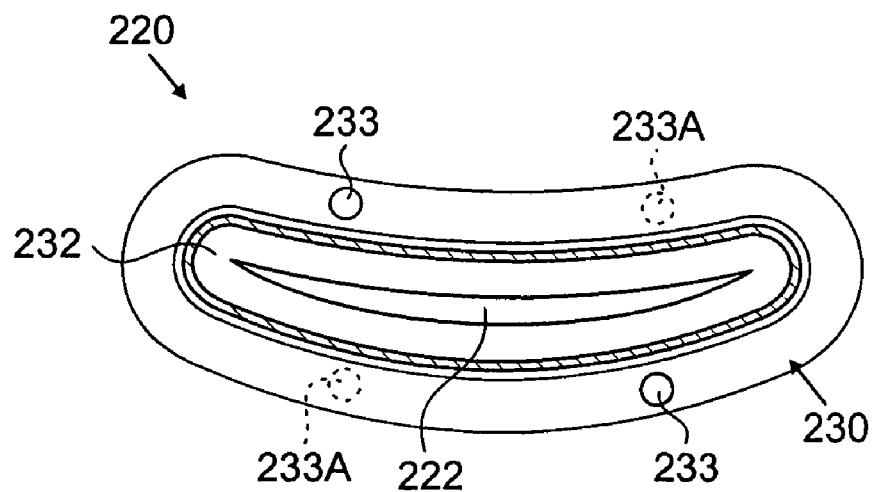
FIG. 3 is a bottom view of a portion of the replacement FEGV assembly.

FIG. 3 is a bottom view of a portion of the FEGV assembly 220. As shown in FIG. 3, the airfoil structure 222 has an aerodynamic shape, and the wedge 232 follows the contours of the sides of the airfoil structure 222. A pair of holes 233 extend through the slip collar 230, which allow fasteners (see FIG. 4) to secure the FEGV assembly 220 to the engine 100. The holes 233 are located on opposite side of the airfoil 222. In further embodiments, bolt guts (not shown) can be cut into the wedge 232 to locate the holes 233 closer to the airfoil structure 222 as necessary depending upon engine constraints. Optionally, pin holes 233A can be defined in the slip collar 230 to help locate and align the slip collar 230, the base plate 246, and the airfoil structure 222.

Figure 4:
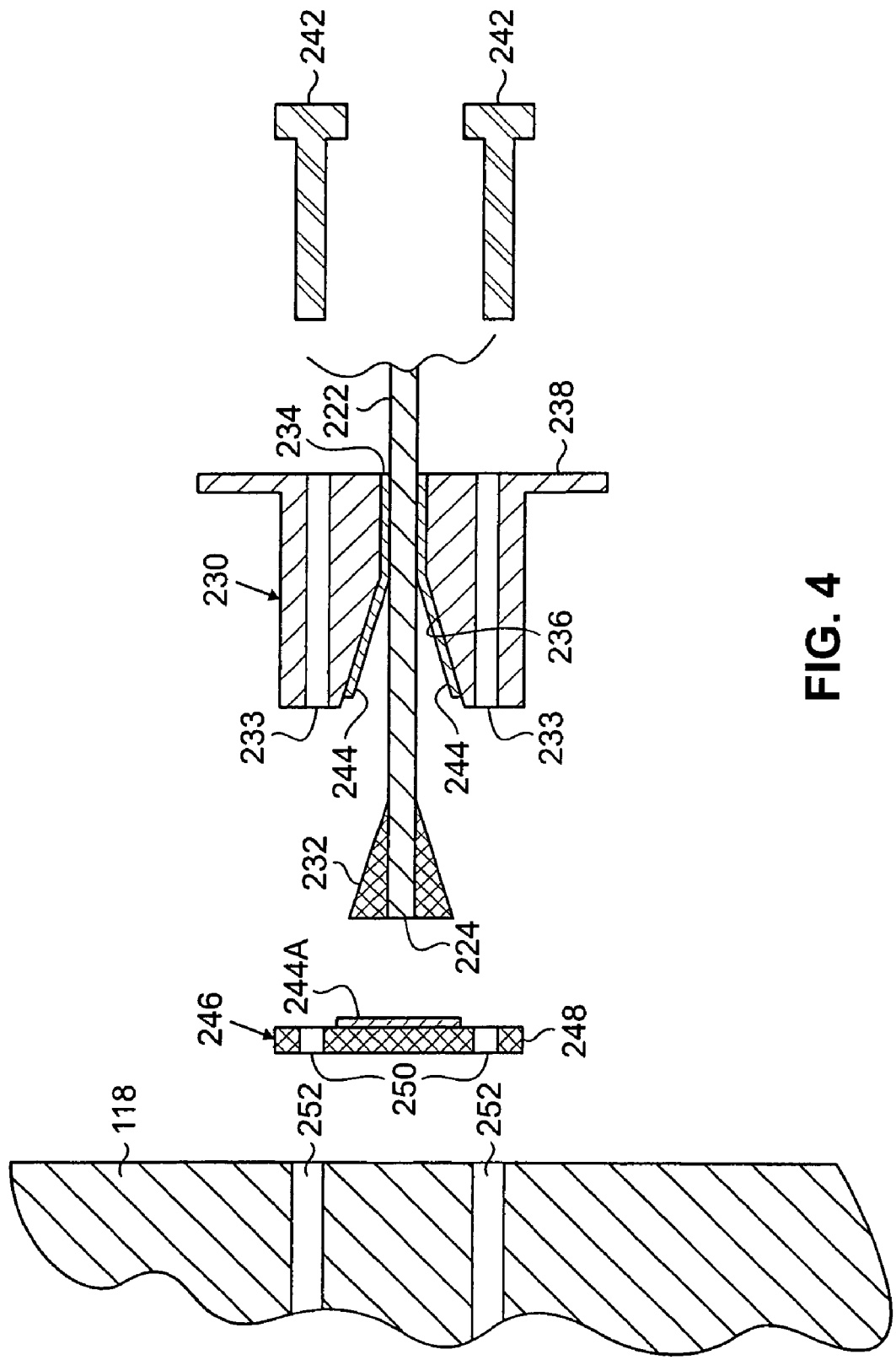
FIG. 4 is an exploded, schematic cross-sectional side view of another portion of the replacement FEGV assembly.

FIG. 4 is an exploded, schematic cross-sectional side view of a portion the FEGV assembly 220 adjacent to the outer case 118 of the engine 100. As shown in FIG. 4, the slip collar 230 includes a central opening 234 and a recess 236 at the outer end of the opening 234. The slip collar 230 further includes a radially inward flowpath surface 238 and the holes 233 for fasteners 242 (e.g., bolts). The recess 236 in the slip collar 230 is configured to mate with the wedge 232 to secure the airfoil structure 222. The opening 234 is designed to provide a close fit about the airfoil structure 222 with a damping material 244 located along the interior surfaces of the opening 234 and the recess 236. The slip collar 230 can be made of a metallic material, such as aluminum, or a composite material. The damping material 244 is a conformable material, and can be a rubber material such as a two-part silicone rubber (e.g., Silastic J® silicone rubber, available from Dow Corning Corp., Midland, Mich.) or other material known to one skilled in the art; In one embodiment, the damping material 244 is applied to a thickness of about 0.3175 cm (0.125 inches). The damping material 244 can be cast or glued into place.

As shown in FIG. 4, the wedge 232 is a substantially triangular shaped structure located at the outer end 224 of the airfoil structure 222. The particular shape of the wedge 232 can vary as desired. However, the wedge 232 must be designed so as to prevent the wedge from pulling through the opening 234 in the slip collar 230 when in use. This generally involves specifying a minimum crossover area (i.e., insuring that an adequate amount of material of the wedge 232 extends beyond the cross-sectional area of the opening 234) assuming all of the conformable material 244 is missing. In one embodiment, the wedge 232 can be 1.016 cm (0.4 inches) in radial length, 0.5865 cm (0.2309 inches) in circumferential width on each side of the airfoil structure 222, and have a draft angle of 30° from a stacking line of the airfoil structure 222.

The FEGV assembly 220 includes a base plate 246 that is positioned between the outer end 224 of the airfoil structure 222 and the outer case 118 of the engine 100. If there is potting material (not shown) present at the installation location on the outer case 118, the base plate 246 can be pushed into the potting material, which is typically compliant. The base plate 246 has a thickness that accommodates any shortening of the length L of the airfoil structure 222 to ensure that the entire replacement FEGV 220 fits appropriately between the inner and outer cases 116 and 118. The base plate 246 includes a layer of damping material 244A on an inner surface, and includes a protective material 248 comprising a coating of polytetrafluoroethylene (PTFE) or a similar friction-reducing material on an opposite outer surface. The coating 248 facilitates installation and helps prevent damage to the outer case 118. However, the coating 248 can be omitted in alternative embodiments. Optionally, another layer of PTFE or a similar friction-reducing material can be applied along the surfaces of the wedge 232 in order to reduce friction and wear between the wedge 232 and the conformable material 244 resulting from incidental slippage between those components.

Holes 250 for the fasteners 242 are defined through the base plate 246. The fasteners 242 can be inserted through holes 240 in the slip cover 230, holes 250 in the base plate 246, and into holes 252 in the outer case 118 of the engine 100. The base plate 246 can be made of a metallic material such as aluminum, or of a composite material. It is preferred that the slip collar 230 be made of substantially the same material as the base plate 246, which is desirable for thermal expansion and other compatibility reasons. Optionally, the base plate 246 can include pins (not shown) that align with pin holes 233A in the slip collar 230 to assure proper positioning of the replacement FEGV assembly 220.

Figure 5:
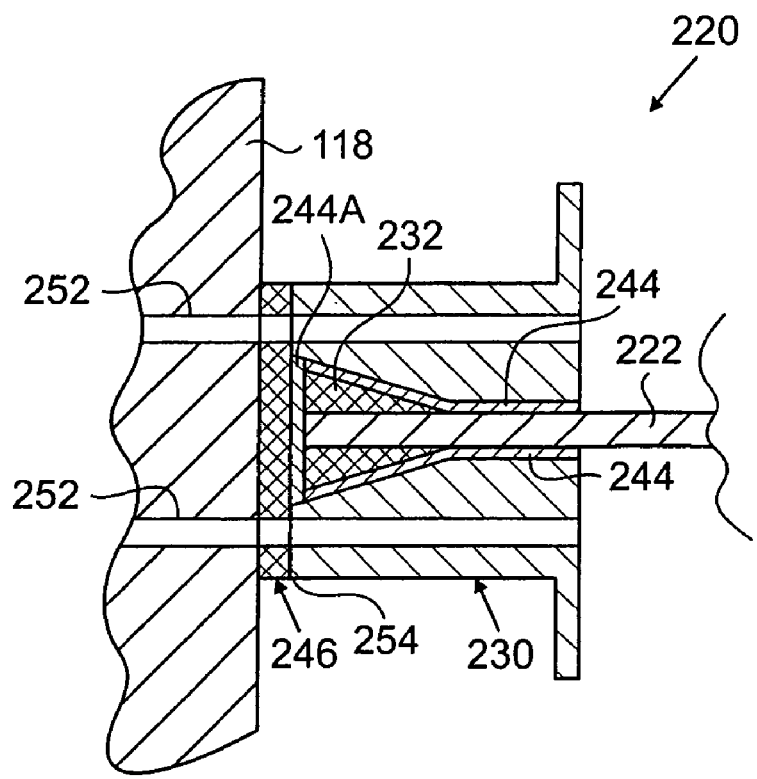
FIG. 5 is a schematic, cross-sectional side view of a portion of the replacement FEGV assembly.

FIG. 5 is a schematic cross-sectional view of the FEGV assembly 220 (the fasteners 242 are omitted in FIG. 5 for simplicity). As shown in FIG. 5, the wedge 232 is positioned within the recess 236 in the slip collar 230, and the base plate 246 is positioned in contact with the slip collar 230 adjacent to the outer end 224 of the airfoil structure 222. The wedge 232 secures the outer end 224 of the airfoil structure 222 in a compression fit between the base plate 246 and the slip collar 230. An anti-gallant lubricant coating is applied at an interface between the base plate 246 and the slip collar 230, adjacent to the layer of damping material 244A on the base plate 246.

Figure 6:
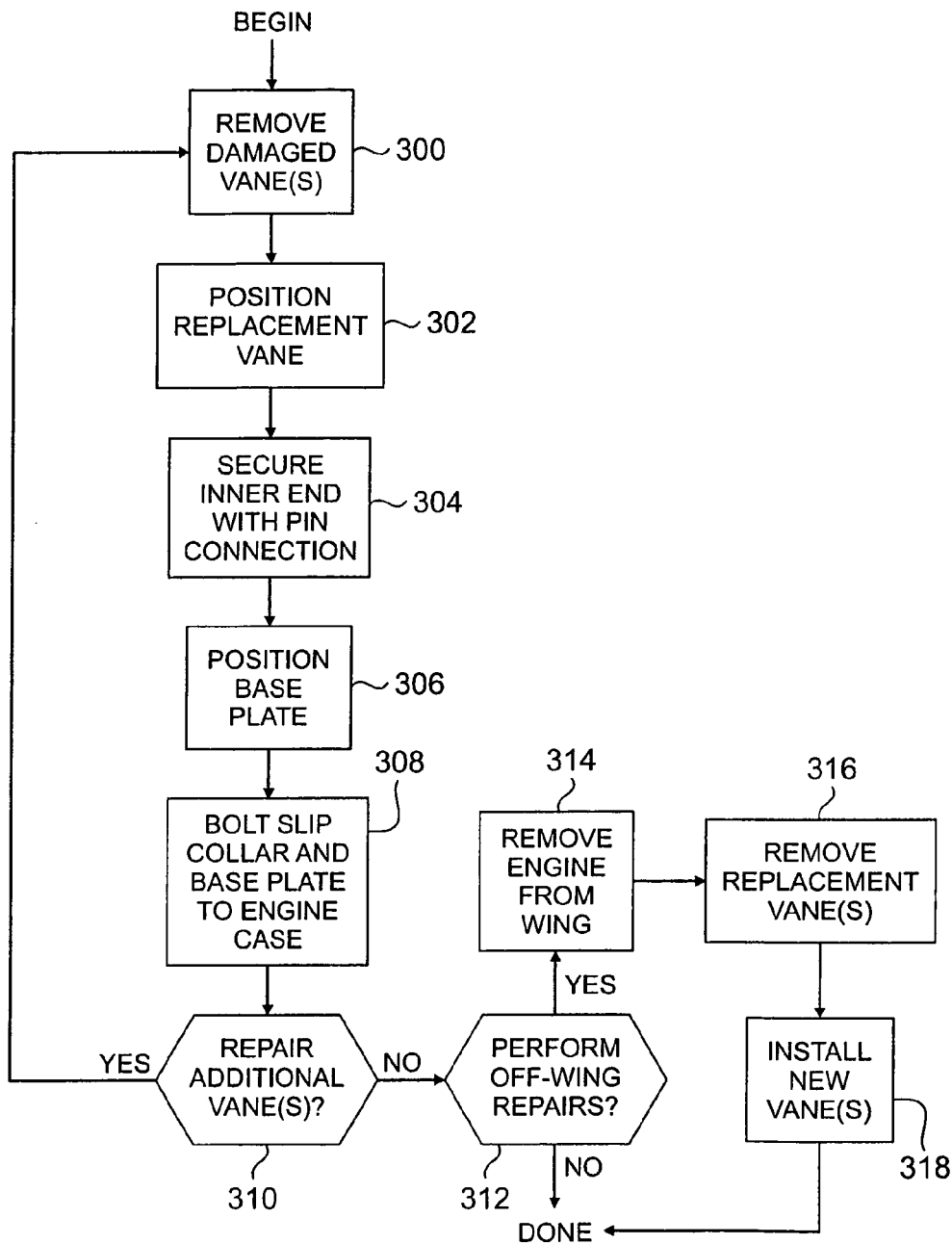
FIG. 6 is a flow chart of a method of repair according to the present invention.

FIG. 6 is a flow chart of an exemplary non-limiting method of repair according to the present invention. This method can utilize the FEGV assembly 220 described above to at least temporarily replace damaged or missing FEGVs in a gas turbine engine. Repairs can be conducted as follows.

First, where one or more damaged FEGVs are present, a selected (damaged) FEGV desired to be replaced is removed from between the inner and outer cases of the engine as necessary (step 300). Damaged FEGVs can be removed by sawing or cutting them in half and removing connection structures of the removed FEGV. Potting material used to secure the original FEGV to the outer case can also be removed. In addition, it may be desirable to remove multiple FEGVs at approximately the same time where multiple FEGVs are damaged. For instance, when two or more FEGVs are removed, enough space may exist to rotate one or more FEGVs off the original connection pins without sawing those FEGVs in half. Where it is desired to install a replacement FEGV at a location where the original FEGV is missing (i.e., liberated) from the engine, it may be unnecessary to remove any existing FEGVs and thus step 300 should be considered optional.

Next, a replacement FEGV assembly is positioned between the inner and outer cases of the engine in a desired installation location (step 302). The replacement FEGV is typically rocked into place with swinging or arcing motions. Then an inner pin-type connection structure is secured in a "floating" configuration to an inner case of the engine (step 304). As noted above, the inner pin-type connection can be identical to original FEGV inner end connection structures and the inner pin-type structure of the replacement FEGV can be installed in essentially the same manner as with the original FEGV.

Once the inner end of the replacement FEGV is secured to the inner case, a base plate is positioned between the outer case and the rest of the replacement FEGV assembly, including its airfoil structure and slip collar (step 306). As part of this step, the outer end of the FEGV assembly is moved into a relatively close fit between the inner and outer cases of the engine. A friction-reducing coating on the base plate can facilitate sliding it into position. The wedge at the outer end of the airfoil structure is compressively secured in a recess in the slip collar, between the slip collar and the base plate. Next, bolts are inserted through the slip collar and the base plate of the replacement FEGV assembly and into the outer case of the engine, and then tightened (step 308). The bolts affirmatively secure all the components of the replacement FEGV assembly to the outer case of the engine via the compressive fitting of the wedge and outer end of the airfoil structure of the replacement FEGV assembly. The damping material located along the opening and recess in the slip collar, as well as along the base plate, provide sufficient deformation to make the compressive fitting snug and secure. In this way, the outer end of the replacement FEGV assembly is secured so as to prevent movement in any direction.

Once a first replacement FEGV is installed, additional replacement FEGVs can be installed if desired (step 310). Additional replacement FEGVs are each installed by repeating the steps described above (steps 300-308). Where there is little clearance between adjacent replacement FEGVs, the slip collars of the adjacent replacement FEGVs can be arranged to overlap in a shingled configuration.

The repair process described above (steps 300-310) can all be completed while the engine being repaired remains in an on-wing position on an airframe of an aircraft. The replacement FEGVs allow the engine to return to service within about 5-10 hours, and the engine with the replacement FEGVs can remain in service for an extended period of time (e.g., greater than about 50 hours of service). However, it may be desired that one or more replacement FEGVs installed according to the present invention remain installed in the engine only temporarily until a time when more extensive off-wing repairs are convenient.

If off-wing repairs to the engine are desired (step 312), the engine can be removed from the airframe (step 314). Then replacement vanes previously installed to replace damaged or missing original FEGVs are removed from the engine (step 316). Lastly, new FEGVs substantially identical to the original FEGVs are installed (step 318). The installation of these new FEGVs typically requires the removal of engine case structures and/or other engine components in a manner that is impossible or impractical when the engine is on-wing.

It should be understood that the present invention provides numerous advantages. Perhaps most importantly, the apparatus and method of the present invention provide a relatively simple, quick and cost-effective solution for repairing damaged or missing FEGVs of gas turbine engines while the engine can remain in an on-wing position. Moreover, the compressive fitting used to secure an outer end of a replacement FEGV assembly to an outer case allows damping to be provided to enhance the robustness of the FEGV attachment.

Although the present invention has been described with reference to preferred embodiments, workers skilled in the art will recognize that changes may be made in form and detail without departing from the spirit and scope of the invention. For instance, the arrangement of the components of a replacement FEGV assembly of the present invention can vary. As one example, the slip collar could be located near an inner end and the conventional pin-type connection structure near the outer end of a replacement FEGV assembly.

What is claimed is:

1. A replacement fan exit guide vane assembly for installation between an inner case and an outer case of a gas turbine engine, the assembly comprising:

an airfoil structure having an outer end and an inner end;

a wedge structure connected to the outer end of the airfoil structure;

a base plate configured to be positioned between the outer end of the airfoil structure and the outer case;

a slip collar having an opening therethrough and a recess formed along the opening, wherein the airfoil structure is positioned to extend through the opening, and wherein the recess is configured to accept the wedge structure to create an interference fit between the slip collar and the base plate; and a conformable material disposed along the opening and the recess in the slip collar and also along the base plate in order to provide dampening relative to the airfoil structure and the wedge structure.

2. The assembly of claim 1 and further comprising:
a fastener for securing the slip collar and the base plate to the outer case.

3. The assembly of claim 1, wherein a layer of low friction material is applied to a portion of the assembly to reduce friction-related wear.

4. The assembly of claim 3, wherein the low friction material comprises polytetrafluoroethylene.

5. The assembly of claim 1, wherein the conformable material comprises a silicone rubber material.

6. The assembly of claim 1, wherein the wedge structure has a 30° draft with respect to the airfoil structure.

7. The assembly of claim 1, wherein the slip collar comprises a material that is substantially the same as a material comprising the base plate.

8. The assembly of claim 1, wherein the airfoil structure comprises a material that is substantially the same as a material comprising the wedge structure.

9. The assembly of claim 1 and further comprising:
an antigallant lubricant disposed at an interface between the base plate and the slip collar.

10. The assembly of claim 1 and further comprising:
a pin connection structure for securing the inner end of the airfoil structure to the inner case.

11. The assembly of claim 1, wherein the airfoil structure has a radial length that is less than a radial length of airfoil structures of original fan exit guide vanes of the engine.

12. The assembly of claim 1, wherein the wedge structure is adhesively bonded to the airfoil structure.

13. The assembly of claim 1, wherein the wedge structure is welded to the airfoil structure.

14. A method for repairing a fan exit guide vane of a gas turbine engine, the method comprising:

positioning a replacement vane between an inner case and an outer case of the engine, wherein a movable slip collar is positioned around the replacement vane;

securing an inner end of the replacement vane to the inner case using a pinned connection;

positioning a base plate between the outer case and an outer end of the replacement vane; and fastening the slip collar to the base plate and the outer case in order to secure the replacement vane to the outer case with a compression type fitting.

15. The method of claim 14 and further comprising the step of:
removing a first existing damaged vane from between the inner casing and the outer casing.

16. The method of claim 15 and further comprising the step of:
removing a second existing damaged vane from between the inner casing and the outer casing, wherein the second existing damaged vane is adjacent to the first existing damaged vane.

17. The method of claim 14, wherein the gas turbine engine remains on the wing of an aircraft while repair steps are performed.

18. The method of claim 14 and further comprising the steps of:
removing the replacement vane; and
installing a permanent vane in place of the replacement vane.

19. The method of claim 14, wherein the step of fastening the slip collar to the base plate and the outer case comprises securing bolts therebetween.

20. A replacement fan exit guide vane assembly for installation between an inner case and an outer case of a gas turbine engine, the assembly comprising:

an airfoil structure having an outer end and an inner end;

a slip collar having an opening therethrough, wherein the airfoil structure is positioned to extend through the opening such that the outer end of the airfoil structure is retained by the slip collar in an interference-type compression fit; and a base plate configured to be positioned between the outer end of the airfoil structure and the outer case.

21. The assembly of claim 20 and further comprising:
a conformable material disposed between the outer end of the airfoil and the slip collar.

* * * * *